Figure 1:
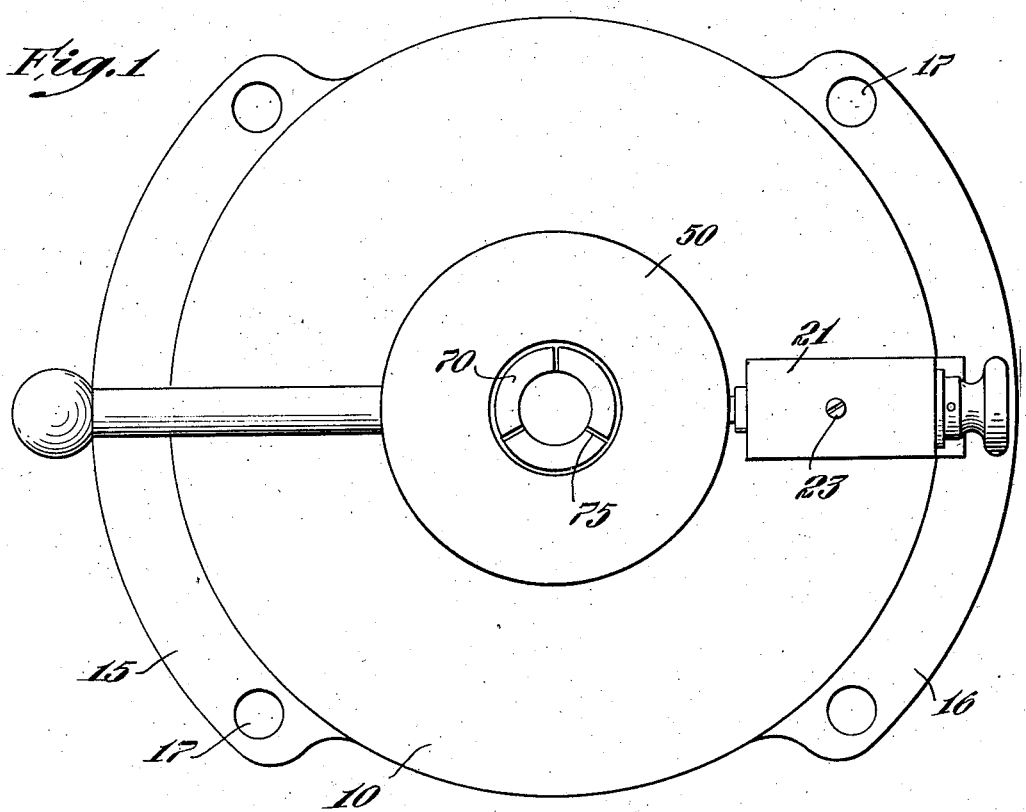

Oct. 28, 1947.  C. GUSTAFSON  2,429,617
WORK OR TOOL HOLDING FIXTURE
Filed July 10, 1945

Inventor
Carl Gustafson
by Roberts, Cushman & Grover
Att'ys.

Patented Oct. 28, 1947

2,429,617

UNITED STATES PATENT OFFICE 2,429,617

WORK OR TOOL HOLDING FIXTURE

Carl Gustafson, Lunenburg, Mass.

Application July 10, 1945, Serial No. 604,127

7 Claims. (Cl. 90—59)

The present invention relates to holding fixtures for machine shops, and more particularly to work or tool holders of the collet chuck type.

It is the principal object of the present invention to provide a collet chuck whose collet is stationary at all times in the sense that it will not move axially when a work piece or a tool is put thereinto, nor during the machining operation or when the work piece is removed therefrom; and generally to provide a chuck of the herein described type which has a minimum number of parts, is very simple in assembly and operation, can be manufactured with any degree of accuracy, and is adaptable to diverse machine shop operations.

Other objects of the invention are to provide a collet chuck which can be tightened and loosened with a simple movement, and after having been tightened, can be indexed with an equally simple operation; to provide a collet chuck which will not be clogged with chips, having an opening which allows their discharge; and to provide a chuck whose collet can be easily replaced without disturbing its general assembly.

In one of its aspects, the invention contemplates a collet chuck having a sleeve that is rotatable on a mounting body without axial movement, and carries two screw-engaged members, one of which is secured against axial motion but can rotate relatively to the chuck sleeve and has a flat collet engaging face, whereas the other member is secured against rotation relatively to the sleeve but is axially movable and has a conical collet engaging face; the collet floats between the two faces and is, together with the first-mentioned screw-engaged member, axially immovable relatively to the sleeve. With the collet tight, it forms with the two screw-engaged members and the sleeve a single rigid unit that is rotatable on the mounting body. In another aspect, the above-mentioned sleeve member is provided with index holes which can be secured relatively to the mounting body with appropriate means, such as an indexing plunger, whereupon the chuck can be tightened by relatively rotating the above-mentioned screw-engaged members, after which the indexing position can be changed. Another feature of the invention is a manipulating handle on the above-mentioned axially immovable member which cooperates with the indexing plunger for the tightening and loosening operations and the indexing. A further feature of the invention is the tubular shape of all of its elements which permits free discharge of chips. Still another feature of the invention is easy disengagement of one of the collet-engaging members, while the other is held against rotation by the indexing means, which permits easy removal and exchange of the collet.

Figure 2:
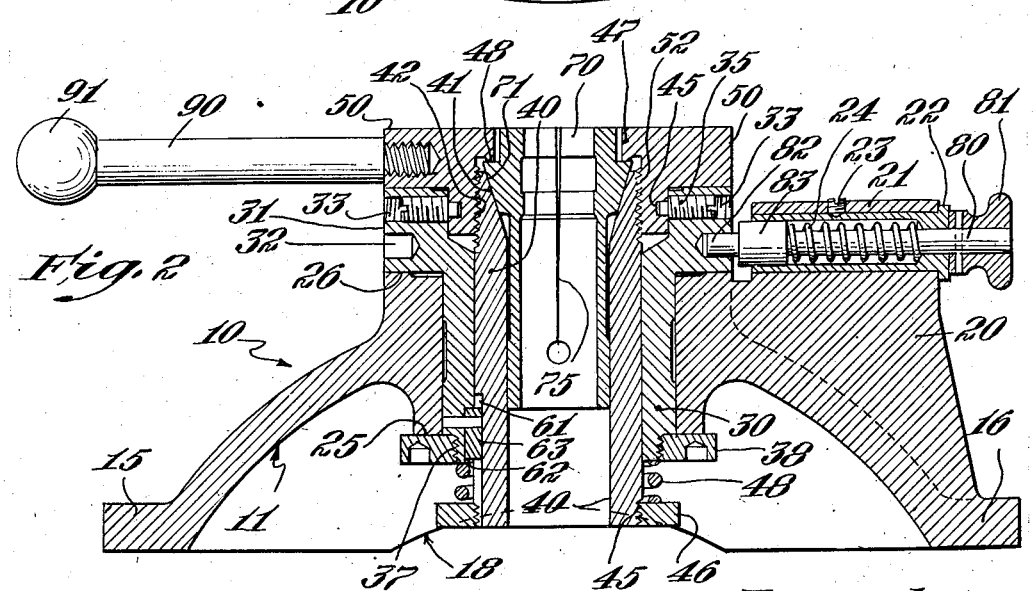

These and other objects, aspects and features will appear from the following description of a practical embodiment of the invention illustrating its novel characteristics, this description referring to a drawing wherein Fig. 1 is a top view of a collet chuck according to the invention; and Fig. 2 is a section through the axis of Fig. 1.

In the drawing, numeral 10 denotes the chuck body which has a cup-shaped base portion 11 and two flanges 15, 16 with holes 17 for fastening it to the machine in connection with which it is to be used. The base portion is cut out at 18, in order to permit removal of chips.

The body 10 is also provided with a web 20, supporting a plunger sleeve 21 with bushing 22 held by a set screw 23 and confining a spring 24 for the indexing plunger to be described hereinbelow. For supporting the chuck sleeve mechanism, the body has two machined transverse faces 25 and 26 on its outer and inner ends.

Inserted within the tubular portion of body 10 is an indexing sleeve 30 (herein also referred to as carrying sleeve) with a flange portion 31 engaging the above-mentioned face 26 of body 10 and an upper collet presenting face. The flange portion 31 also has a series of indexing holes 32, whose spacing and number may vary in any desirable way according to requirements. Flange 31 is further provided with threaded holes 33 for two or more dog point set screws 35 which engage an annular groove of the collet cap to be described hereinbelow. The other end of the indexing sleeve 30 is provided with a shoulder and a threaded portion 37, the threaded portion being adapted to receive a nut 38 which engages with sliding fit the above-mentioned face 25 of the chuck body 10.

Carried by the narrow tube and wider flange portions of indexing sleeve 30 are tubular collet sleeve 40 and a collet cap 50, respectively. The collet sleeve 40 has at one end a taper 41 and on the outside, opposite the taper, a threaded portion 42. At the other end of the collet sleeve is a thread 45 to which is screwed a nut 46. Between nut 46 and the lower transverse face of indexing sleeve 30 is inserted a compression spring 48, which tends to draw the collet sleeve downwardly.

The collet cap 50 has a thread 52 engaging the above-mentioned threaded portion 42 of the collet sleeve, and on its outer periphery an annular groove 45, engaging the above-mentioned dog point set screws 35 of indexing sleeve 30. The collet cap has further an inwardly extending flange 47 with a transverse face 48 facing downwardly.

Indexing sleeve 30 and collet sleeve 40 have corresponding keyways 61, 62. Secured in keyway 62 is a collet sleeve key 63, which prevents relative rotation between the collet sleeve and the indexing sleeve.

The collet proper, indicated at 70, is of the conventional type, with taper 71 fitting taper 41 of the collet sleeve, and slots 75, providing the required spring action.

The above-mentioned plunger spring bushing 21 carries an indexing plunger 80 with handle 81, point 82, and guide 83, the above-mentioned spring 24 urging the plunger inwardly towards the indexing flange 31 of sleeve 30. The collet cap 50 carries, screwed thereinto, a chuck opening and closing lever 90, with handle 91.

The collet chuck according to the invention is used as follows.

In order to open the chuck, one of the indexing holes 32 of flange 31 of indexing sleeve 30 is engaged by plunger 80. Lever 90 can thereupon be rotated, moving collet cap 50 upward relatively to collet sleeve 40, thus permitting the collet to expand; during this operation collet cap 50 is prevented from axial movement by dog point set screws 35 sliding in annular groove 45, whereas collet sleeve 40 can slide downwardly on key 63 while being prevented from rotating. It will be noted that the expanding collet will remain in contact with both collet cap and collet sleeve, thus retaining its position, without rotating, so long as the indexing plunger engages the indexing sleeve. The work piece or tool is now inserted into the collet, and lever 90 rotated in opposite direction, thereby drawing the collet cap against the collet sleeve and tightening the collet, which now forms with collet cap, collet sleeve and indexing sleeve a rigid unit. The indexing plunger 80 can now be disengaged, and the indexing sleeve, together with collet cap, collet sleeve, collet and work piece, rotates until it assumes the desired position, where it is fixated by means of the plunger.

It should be noted that the groove 45, engaged by the dog point screws 35, serves to hold the collet cap from working up as a heavy chip is being taken. Spring 48 is sometimes not sufficient for that purpose but has the main function of drawing down the collet sleeve 40 which in turn holds the collet cap 50 down against the index sleeve 30.

For replacing or exchanging the collet, the dog points 35 are unscrewed, collet cap 50 is removed by means of lever 90, while the indexing plunger engages the indexing sleeve, the collet is lifted from the collet sleeve 40 and replaced as desired, whereupon the collet cap is again screwed on, and the dog point set screws re-inserted. It will be noted that the limited length of keyway 61 prevents excessive drawing back of sleeve 40 by spring 48 during this replacement operation.

It will be understood that, while the herein described embodiment is particularly adapted to serve as a work holder, the collet chuck according to the invention can also be used as a tool holder.

It should be understood that the present disclosure is for the purpose of illustration only and that this invention includes all modifications and equivalents which fall within the scope of the appended claims.

I claim:

1. A holding fixture comprising a carrying sleeve having a collet presenting face, a collet fastening member having a collet engaging face and extending over said collet presenting face, means for securing said fastening member to said carrying sleeve for rotation without axial movement, a second collet fastening member coaxial with said first member and secured to said carrying sleeve for axial movement without rotation and also having a collet engaging face opposite said first face, one of said faces being transversely flat and the other tapered, means for helically engaging said fastening members for relative rotatory and axial movement, and a collet floating between and having two faces adapted to contact said collet engaging faces, relative rotatory and hence also axial movement of said fastening members compressing or releasing said collet without movement of the collet relatively to the fastening member having the flat face.

2. A holding fixture comprising a carrying sleeve having a collet presenting face, a collet fastening member having a flat transverse collet engaging face and extending over said collet presenting face, means for securing said fastening member to said sleeve for rotation without axial movement, a second collet fastening member secured to said first fastening member and to said sleeve for axial movement without rotation and having a tapered collet engaging face opposite said transverse face, means for helically engaging said fastening members for relative rotatory and axial movement, and a collet extending between and having two faces adapted to contact said collet engaging faces, relative rotatory and hence also axial movement of said fastening members compressing or releasing said collet without movement of the collet relatively to said carrying sleeve.

3. A holding fixture comprising a mounting body, an indexing sleeve rotatably supported on said body, a collet fastening member secured to said sleeve for rotation without axial movement and having a flat transverse collet engaging face, a second collet fastening member secured to said sleeve for axial movement without rotation and having a tapered collet engaging face opposite said transverse face, means for helically engaging said fastening members for relative rotatory and axial movement, a collet extending between and having two faces adapted to contact said collet engaging faces, and means for securing said indexing sleeve to said mounting body in predetermined axial position, relative rotatory and hence also axial movement of said fastening members compressing or releasing said collet without movement of the collet relatively to said indexing sleeve but permitting indexing movement between said sleeve and said body.

4. A holding fixture for machine shops comprising a mounting body, an indexing sleeve rotatably supported on said body, a collet fastening member secured to said sleeve for rotation without axial movement and having a flat transverse collet engaging face, a second collet fastening member secured to said sleeve for axial movement without rotation and having a tapered collet engaging face opposite said transverse face, means for helically engaging said fastening members for relative rotatory and axial movement, a collet extending between and having two faces adapted to contact said collet engaging faces, means for rotating said first collet fastening member relatively to said indexing sleeve, and means for securing said indexing sleeve to said mounting body in predetermined axial position, rotatory movement of said first fastening member and hence axial movement of said second fastening member compressing or releasing said collet without movement of the collet relatively to said indexing sleeve but permitting indexing movement between said sleeve and said body.

5. A collet chuck comprising a mounting body having a tubular sleeve open on both ends; an indexing sleeve open on both ends rotatably fitting into said mounting sleeve, said indexing sleeve having means for securing it against axial movement relatively to said mounting body and indexing means on its outer periphery; a tubular collet cap open at both ends having a transverse face, means for engaging said indexing sleeve for rotation without axial movement therein, and a screw thread; a tubular collet sleeve open at both ends and having at one end a tapered face, means limiting the movement between said collet sleeve and said indexing sleeve to the axial direction, and a screw thread engaging said collet cap thread; a spring collet engaged between said collet cap face and said tapered collet sleeve face; and means for fixating said indexing sleeve in predetermined position relatively to said mounting body.

6. A collet chuck comprising a mounting body having a sleeve; an indexing sleeve rotatably fitting into said mounting sleeve, said indexing sleeve having means for securing it against axial movement relatively to said mounting body and index plunger engaging means on its outer periphery; a collet cap having a transverse face, means for engaging said indexing sleeve for rotation without axial movement therein, and a screw thread; a collet sleeve having at one end a tapered face, means limiting the movement between said collet sleeve and said indexing sleeve to the axial direction, and a screw thread engaging said collet cap thread; a spring collet engaged between said collet cap face and said tapered collet sleeve face; and an indexing plunger mounted on said body for contact with said engaging means.

7. A collet chuck comprising a mounting body having a tubular sleeve open on both ends; an indexing sleeve open on both ends rotatably fitting into said mounting sleeve and secured thereto against axial movement by two transverse shoulders, one of which is part of a nut screwed to said index sleeve, said indexing sleeve having a longitudinal key between said shoulders, indexing holes on its outer periphery, and inwardly extending dog point screws; a tubular collet cap open at both ends, having at one end an outer annular groove engaging said dog point screws, and having at the other end an inner screw thread; a tubular collet sleeve open at both ends and having at one end a tapered face, at the other end a nut facing said shoulder nut of said indexing sleeve, a keyway engaging said indexing sleeve key, and an outer thread for engaging said collet cap thread; a compression spring between said indexing sleeve and said collet sleeve unit; a spring collet engaged between said collet cap face and said tapered collet sleeve face; an indexing plunger mounted on said body for engagement with said indexing holes; and an operating handle fastened to said collet cap.

CARL GUSTAFSON.

REFERENCES CITED

The following references are of record in the file of this patent:

UNITED STATES PATENTS

| Number | Name | Date |
|---|---|---|
| 2,308,493 | De Rentiis | Jan. 19, 1943 |
| 1,260,130 | Bemis | Mar. 19, 1918 |
| 2,186,236 | Dearborn | Jan. 9, 1940 |
| 2,144,486 | Erb | Jan. 17, 1939 |